(12) United States Patent
Kääriäinen et al.

(10) Patent No.: US 9,723,463 B2
(45) Date of Patent: Aug. 1, 2017

(54) METHOD AND APPARATUS FOR A DEVICE IDENTIFIER BASED SOLUTION FOR USER IDENTIFICATION

(75) Inventors: Teemu Kääriäinen, Espoo (FI); Jari Tapio Otranen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/911,470

(22) Filed: Oct. 25, 2010

(65) Prior Publication Data
US 2012/0102008 A1    Apr. 26, 2012

(51) Int. Cl.
| G06F 17/30 | (2006.01) |
| H04W 4/20 | (2009.01) |
| G06Q 30/02 | (2012.01) |
| G06F 21/10 | (2013.01) |
| H04W 4/06 | (2009.01) |

(52) U.S. Cl.
CPC ............ *H04W 4/206* (2013.01); *G06F 21/10* (2013.01); *G06Q 30/0201* (2013.01); *H04W 4/06* (2013.01)

(58) Field of Classification Search
CPC ...... G06F 21/31; G06F 17/30; G06F 21/6254; G06F 21/62; G06Q 10/063114
USPC ...... 707/999.01, 999.107, 783, 999.009, 703
See application file for complete search history.

(56) References Cited

U.S. PATENT DOCUMENTS

| 7,110,773 | B1 * | 9/2006 | Wallace et al. ............ 455/456.1 |
| 7,853,881 | B1 * | 12/2010 | Aly Assal et al. ............ 715/734 |
| 7,860,934 | B1 * | 12/2010 | Wolfe .................. G06Q 10/107 705/40 |
| 8,671,201 | B2 * | 3/2014 | Keller ............... H04W 36/0022 370/352 |
| 2002/0055848 | A1 | 5/2002 | Jae et al. |
| 2004/0098625 | A1 * | 5/2004 | Lagadec et al. ............. 713/201 |
| 2004/0162058 | A1 * | 8/2004 | Mottes ......................... 455/411 |
| 2004/0210763 | A1 * | 10/2004 | Jonas ................ G06F 17/30477 713/193 |
| 2006/0149671 | A1 * | 7/2006 | Nix et al. ......................... 705/40 |
| 2006/0224583 | A1 | 10/2006 | Fikes et al. |
| 2006/0265507 | A1 | 11/2006 | Banga et al. |
| 2006/0271690 | A1 | 11/2006 | Banga et al. |
| 2007/0288486 | A1 * | 12/2007 | Sugihara ............... 707/E17.032 |
| 2008/0183487 | A1 | 7/2008 | Wachi |
| 2009/0077635 | A1 | 3/2009 | Wang et al. |

(Continued)

FOREIGN PATENT DOCUMENTS

| CA | 2603087 A1 | 10/2008 |
| CN | 1799042 A | 7/2006 |

(Continued)

OTHER PUBLICATIONS

International Search Report for related International Patent Application No. PCT/FI2011/050733 dated Dec. 7, 2011, pp. 1-5.

(Continued)

*Primary Examiner* — Yuk Ting Choi
(74) *Attorney, Agent, or Firm* — Ditthavong & Steiner, P.C.

(57) ABSTRACT

An approach is provided for a device identifier based solution for user identification. A device identifier component receives from a user device a request for access to a service platform. The device identifier component determines one or more identifiers associated with the user device and generates a record of the access with respect to the one or more identifiers.

15 Claims, 9 Drawing Sheets

(56) References Cited

U.S. PATENT DOCUMENTS

| | | |
|---|---|---|
| 2009/0171754 A1 | 7/2009 | Kane et al. |
| 2009/0171968 A1 | 7/2009 | Kane et al. |
| 2009/0172021 A1 | 7/2009 | Kane et al. |
| 2009/0249459 A1 | 10/2009 | Coughlin et al. |
| 2010/0082775 A1 | 4/2010 | Banga et al. |
| 2010/0121744 A1 | 5/2010 | Belz et al. |
| 2010/0191847 A1* | 7/2010 | Raleigh .................. 709/224 |
| 2010/0199338 A1 | 8/2010 | Craddock et al. |
| 2011/0098030 A1 | 4/2011 | Luoma |
| 2011/0119293 A1* | 5/2011 | Taylor ................ G06F 21/10 707/769 |

FOREIGN PATENT DOCUMENTS

| | | |
|---|---|---|
| CN | 101189608 A | 5/2008 |
| CN | 101248424 A | 8/2008 |
| CN | 101296411 A | 10/2008 |
| EP | 1886224 A2 | 2/2008 |
| EP | 2235858 A1 | 10/2010 |
| JP | 2008541277 A | 11/2008 |
| JP | 2011528925 A | 12/2011 |
| KR | 20070118165 A | 12/2007 |
| WO | WO 2006104952 A1 | 10/2006 |
| WO | WO 2006124570 A2 | 11/2006 |
| WO | 2007040184 A1 | 4/2007 |
| WO | WO 2008/005732 A2 | 1/2008 |
| WO | WO 2009/071736 A1 | 6/2009 |
| WO | WO 2009086014 A1 | 7/2009 |
| WO | WO 2010/093683 A2 | 8/2010 |
| WO | WO 2011051549 A1 | 5/2011 |

OTHER PUBLICATIONS

International Written Opinion for related International Patent Application No. PCT/FI2011/050733, dated Dec. 7, 2011, pp. 1-8.

Chinese Office Action for related Chinese Patent Application No. 201180060636.X dated Sep. 30, 2015, with English-language summary, 16 Pages.

Office Action for corresponding Chinese Patent Application No. 201180060636.X, dated Apr. 12, 2016, with English Language Summary, 17 pages.

* cited by examiner

FIG. 6

| IMEI | MCC + MNC | HASHED MSIN | RESULT |
|---|---|---|---|
| Not Found | Not Found | Not Found | New User |
| Found | Found | Found | Returning User |
| Not Found | Not Found | Found | Returning User |
| Found | Found | Not Found | Returning User |
| Not Found | Found | Found | Returning User |
| Found | Not Found | Not Found | New User |
| Found | Not Found | Found | Returning User |
| Not Found | Found | Not Found | New User |

600

601
603
605
607
609
611

METHOD AND APPARATUS FOR A DEVICE IDENTIFIER BASED SOLUTION FOR USER IDENTIFICATION

BACKGROUND

Service providers and device manufacturers (e.g., wireless, cellular, etc.) are continually challenged to deliver value and convenience to consumers by, for example, providing compelling network services that offer useful, efficient and appealing features, and an enhanced user experience. With many service applications, to provide a more efficient and fully featured user experience, the services are customized based on a user's prior activities in using the service. Also, in many cases, the service providers will provide users the opportunity to access such services for a trial period. During such trial periods, however, the service provider may not wish to administer a subscription system for the trial users. Additionally, a trial user may not be inclined to establish a user account during the trial period. The service provider, therefore, is unable to implement a strong end user authentication prior to the end user registering an account for the service application. Accordingly, it becomes difficult for the service provider to track and associate the prior activities of a trial user to that user upon subsequent access of the service application. Without the ability to associate user activity with a particular user, the service provider is unable to customize the services based on the user's prior activities. As a consequence, service providers and manufacturers face significant technical challenges in delivering network services that are customized based on the user's prior activities in using the service, where the user has not registered a user account for the service (i.e., during a trial period). Such service providers and manufactures are thereby unable to provide such users a more efficient and fully featured user experience with the service.

SOME EXAMPLE EMBODIMENTS

Therefore, there is a need for a device identifier based solution for tracking user activities on a service platform.

According to one embodiment, a method comprises receiving from a user device a request for access to a service platform, determining one or more identifiers associated with the user device, and generating a record of the access with respect to the one or more identifiers. The method also comprises determining, based on the identifiers, whether the user device has previously accessed the service, and associating the record from one or more previous accesses to the service with the user device. The method also comprises determining a user account associated with the request, and associating the record with the user account. The method also comprises creating a user account associated with the request, associating the identifiers with the user account, and associating the record with the user account. The method further comprises adapting the access to the service platform based on the record from the one or more previous accesses to the service.

According to another embodiment, an apparatus comprises at least one processor, and at least one memory including computer program code, the at least one memory and the computer program code configured to, with the at least one processor, cause the apparatus to perform at least the following, determine one or more identifiers associated with the user device in response to a request from a user device for access to a service platform, and generate a record of the access with respect to the one or more identifiers. The apparatus is also caused to determine, based on the identifiers, whether the user device has previously accessed the service, and associate the record from one or more previous accesses to the service with the user device. The apparatus is also caused to determine a user account associated with the request, and associate the record with the user account. The apparatus is also caused to create a user account associated with the request, associate the identifiers with the user account, and associate the record with the user account. The apparatus is further caused to adapt the access to the service platform based on the record from the one or more previous accesses to the service.

According to another embodiment, an apparatus comprises means for receiving from a user device a request for access to a service platform, determining one or more identifiers associated with the user device, and generating a record of the access with respect to the one or more identifiers. The apparatus also comprises means for determining, based on the identifiers, whether the user device has previously accessed the service, and associating the record from one or more previous accesses to the service with the user device. The apparatus also comprises means determining a user account associated with the request, and associating the record with the user account. The apparatus also comprises means for creating a user account associated with the request, associating the identifiers with the user account, and associating the record with the user account. The apparatus further comprises means for adapting the access to the service platform based on the record from the one or more previous accesses to the service.

According to another embodiment, a computer-readable storage medium carries one or more sequences of one or more instructions which, when executed by one or more processors, cause an apparatus to at least receive from a user device a request for access to a service platform, determine one or more identifiers associated with the user device, and generate a record of the access with respect to the one or more identifiers. The apparatus is also caused to determine a user account associated with the request, and associate the record with the user account. The apparatus is further caused to create a user account associated with the request, and associate the identifiers with the user account; and associate the record with the user account.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a table illustrating a heuristic analysis utilized in the processes of FIGS. 3 and 4, according to one embodiment;

DESCRIPTION OF SOME EMBODIMENTS

Examples of a method, apparatus, and computer program for a device identifier based solution for tracking user activities on a service platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
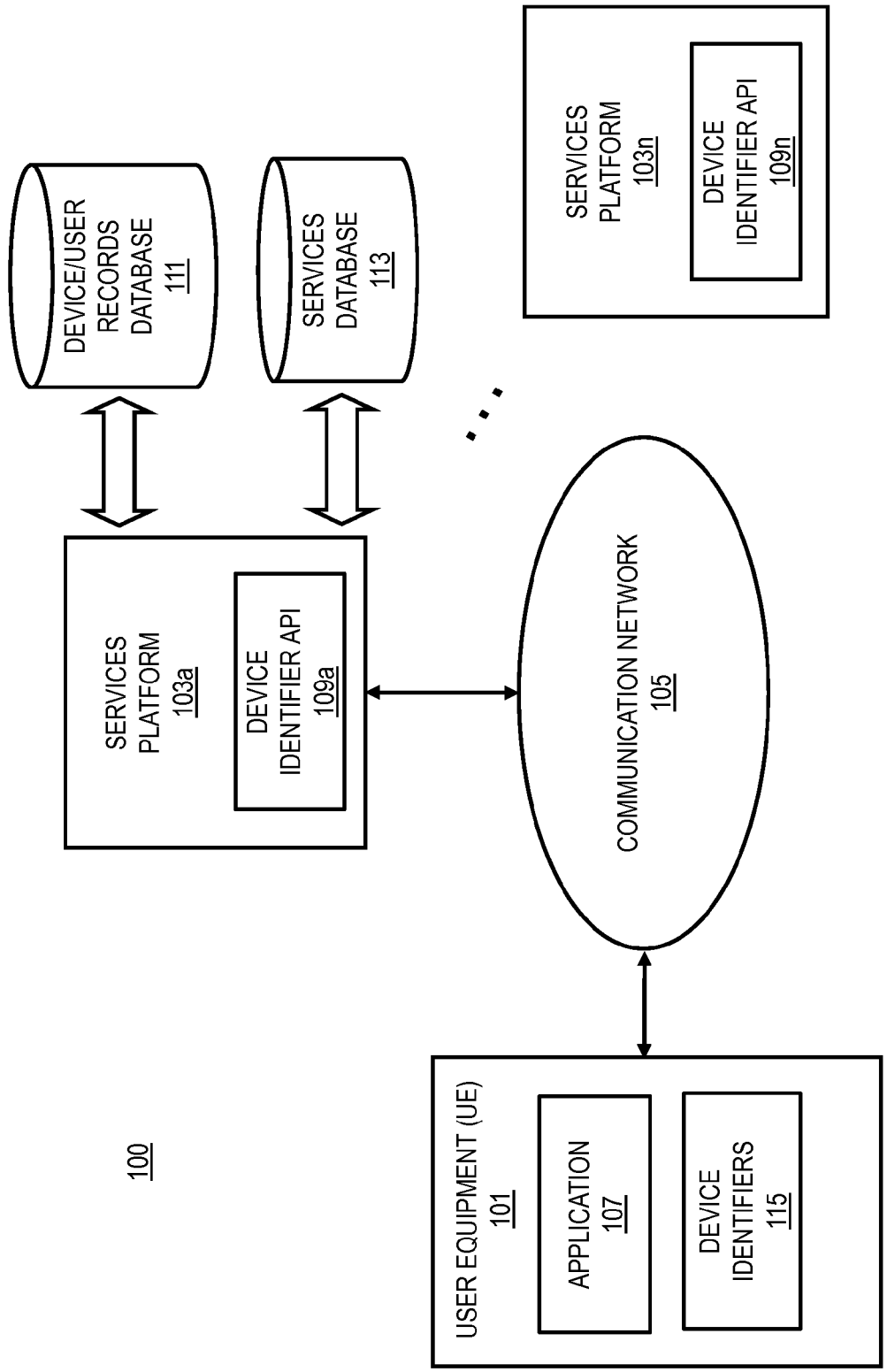
FIG. 1 is a diagram of a system capable of providing a device identifier based solution for tracking user activities on a service platform, according to one embodiment.

FIG. 1 is a diagram of a system capable of providing a device identifier based solution for tracking user activities on a service platform, according to one embodiment. Network services, such as media services (e.g., music services, video services, photo services, etc.), navigation services, gaming services, and the like are increasingly being offered to users who can engage in these services using their devices. Some of these services require authentication of the user or authentication of a registered user account prior to permitting access to the service. As such, the user may be required to activate an account and utilize the account when dealing with the services. In some situations, however, service providers may wish to permit users to access a service application on a trial basis, prior to subscribing to and registering a user account for the service. The ultimate goal of the trial period generally is to entice the user to subscribe to the service under some level of commitment. To accomplish this goal, the trial service must adequately exhibit the full potential and capabilities of the service, and provide an efficient and fulfilling user experience, which can be enhanced by adapting or customizing the service based on the prior activities of the user.

During such a trial period, the service provider may not wish to administer a subscription system for the trial users. Additionally, the user may not be inclined to establish a registered user account during the trial period. The service provider, therefore, is unable to track and associate the prior activities of a trial user to that user upon subsequent access of the service. Accordingly, it becomes difficult for the service provider to track and associate the prior activities of a trial user to that user upon subsequent access of the service. Without the ability to associate user activity with a particular user, the service provider is unable to customize the services based on the user's prior activities. The service provider is thereby unable exhibit the full capabilities of the service, and is unable to maximize the user experience during the trial period.

To address this problem, a system 100 of FIG. 1 introduces the capability to provide a for a device identifier based solution for tracking user activities on a service platform. With this approach, a service application running on a services platform 103 can retrieve device identifiers from the UE 101, and determine, based on the device identifiers, whether the UE 101 represents a new or returning user to the service. A user of the UE 101 initiates an application 107 on the UE 101, and the application 107 sends a request to the services platform 103 to access the associated service.

In response to the request to access the service on the services platform 103, the device identifier API 109 transmits a response to the UE 101 requesting identification of the device identifiers 115 for the UE 101. The UE 101 then transmits the device identifiers 115 to the device identifier API 109 on the services platform 103. The device identifiers may include hardware device identifiers, independent of the user and the user's SIM card 217, in addition to user-based and operator-based identifiers contained in the SIM card 217. The device identifier API 109 performs a heuristic analysis, based on the device identifiers 115, to determine whether the UE 101 represents a returning user with respect to the requested service or a new user.

In the event of a determination that the user is a returning user, the device identifier API 109 retrieves any user history data from the device/user records database 111 associated with previous accesses of the service application by the user, and associates the data with the UE 101 currently accessing the service. Further, the current session data is recorded and appended to the user history data in the device/user records database 111. Alternatively, in the event of a determination that the user is a new user, the device identifiers 115 are stored in the device/user records database 111, and the current session data is recorded and stored in the device/user records database 111 in association with the respective device identifiers 115 for the particular user and UE 101.

Subsequently, at the point where a user creates a registered user account for a service, the device identifiers 115 are stored with the user account profile, and the user history data associated with those device identifiers 115 is retrieved and linked with the user account. The user registers a personal user account for a service on the services platform 103. Next, the device identifier API 109 retrieves the device identifiers 115 from the UE 101. The device identifier API 109 then stores the retrieved device identifiers 115 in the device/user records database 111 as part of the user account profile for the particular user and UE 101.

Next, the device identifier API 109 performs a heuristic analysis, based on the device identifiers 115, to determine whether the UE 101 represents a returning user with respect to the service or a new user. In the event of a determination that the user is a returning user, the device identifier API 109 then retrieves any user history data from the device/user records database 111 associated with previous accesses of the service application by the user, and links such history data with the user account. The current session data is then recorded and appended to the user history data in the device/user records database 111. Alternatively, in the event of a determination that the user is a new user, the current session data is recorded and stored in the device/user records database 111 in association with the respective user account profile for the particular user and UE 101.

As shown in FIG. 1, the system 100 comprises the user equipment (UE) 101 having connectivity to a services platform 103 via a communication network 105. The user equipment (UE) 101 includes device identifiers 115 that are unique to the UE 101 and/or the user/owner of the UE 101. The device identifiers 115 identify the specific UE 101 and/or the user/owner to the services platform 103. The services platform 103 can be one of a plurality of services platforms 103a-103n providing services to the user of the UE 101. Each services platform 103 provides application services to the UE 101. The services platform 103 can record activities of the UE 101 during access to a service, and associate the recorded activities with the particular UE 101 based on the device identifiers 115.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UEs 101 and the services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

An application 107 of the UE 101 can request services from the services platform 103. One or more applications 107 can be executing on the UE 101. Applications 107 can be computer software designed to help a user perform one or more tasks. Examples of applications 107 include media presentation and/or creation (e.g., creation and/or presentation of images, video, audio, etc.), media service access applications (e.g., music, video, streaming media, etc.), word processors, spreadsheets, database manipulation, web browsers, games, purchasing software, etc. An application 107 can request access to services on the services platform 103.

The services are provided to the application 107 pursuant to the access request provided by the application 107 to the services platform 103. The services platform 103 can be associated with a device/user records database 111 that is used to determine whether the UE 101 has accessed the requested service before. The device/user records database 111 further associates any prior recorded activities with the UE 101. As such, a data structure can include one or more device identifiers of the UE 101 as well as prior recorded activities of the UE 101. Services information and content associated with the services can be stored in a services database 113 and provided to the UE 101 via the communication network 105. The services database 113 and/or the device/user records database 111 can be located external to the services platform 103 and/or within the services platform 103.

Figure 2:
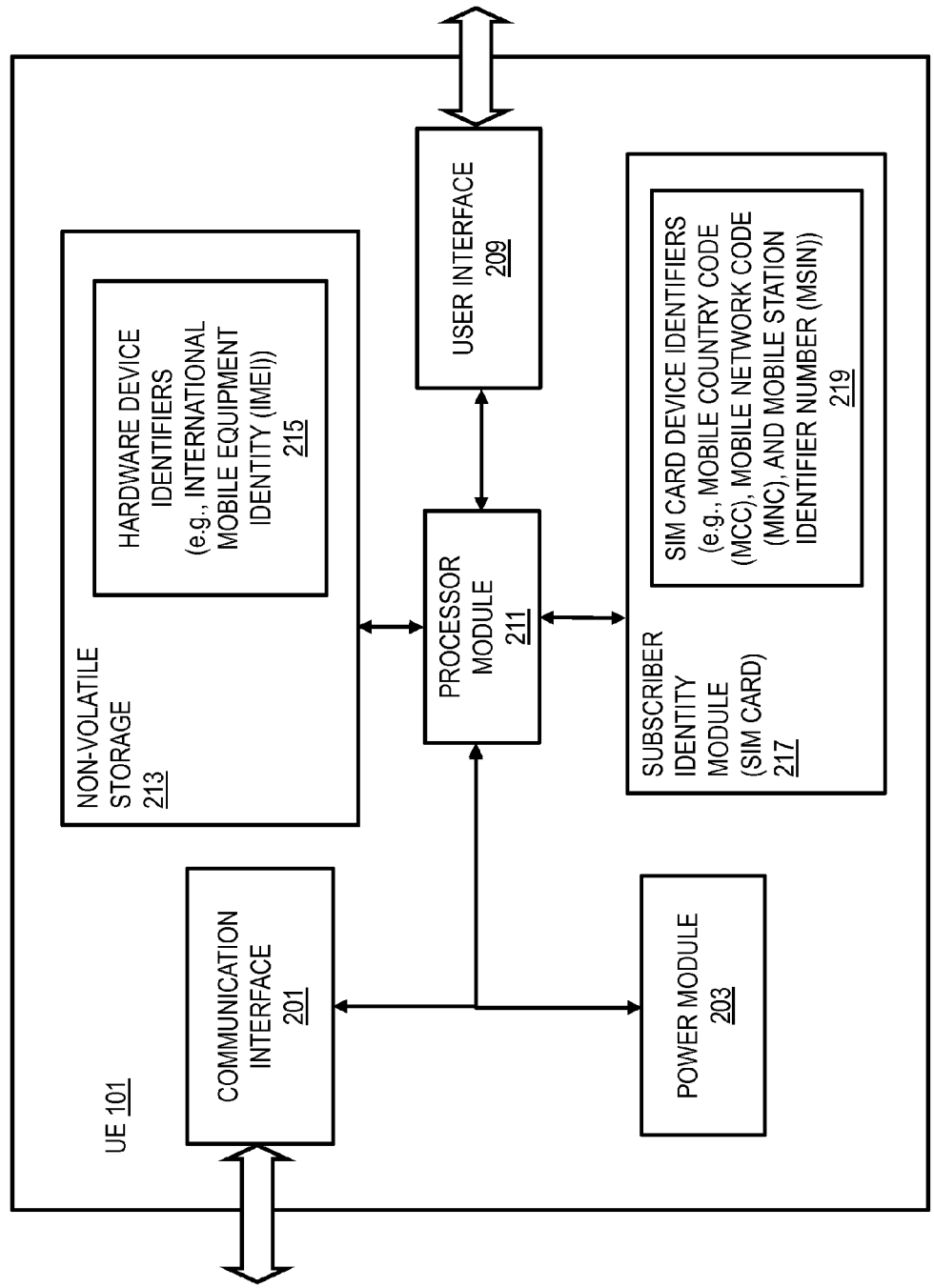
FIG. 2 is a diagram of the components of user equipment capable of providing a device identifier based solution for tracking user activities on a service platform, according to one embodiment.

FIG. 2 is a diagram of the components of user equipment, according to one embodiment. By way of example, the UE 101 includes one or more components for facilitating a device identifier based solution for tracking user activities on a service platform. It is contemplated that the functions of these components may be combined in one or more components or performed by other components of equivalent functionality. In this embodiment, the UE 101 includes a communication interface 201, a power module 203, a processor module 211, non-volatile storage 213 with hardware device identifiers 215, a subscriber identity module (SIM card) 217 with SIM card device identifiers 219, and a user interface 209. Further, the device identifiers 115 comprise the hardware device identifiers 215 and the SIM card device identifiers 219.

In one embodiment, the communication interface 201 can be used to communicate with the services platforms 103, other UEs 101, or other devices on the communication network 105. Certain communications can be via methods such as an internet protocol, messaging, or any other communication method (e.g., via the communication network 105). In some examples, the UE 101 can send a query or a request to utilize services to a services platform 103 via the communication interface 201. The services platform 103 may then send a response back via the communication interface 201 including a request for identification of the device identifiers 215 and/or 219.

The power module 203 provides power to the UE 101. The power module 203 can include any type of power source (e.g., battery, plug-in, etc.). Additionally, the power module 203 can provide power to the components of the UE 101 including processors, memory, transmitters, and receivers.

The user interface 209 can include various methods of communication. For example, the user interface 209 can have outputs including a visual component (e.g., a screen), an audio component, a physical component (e.g., vibrations), and other methods of communication. User inputs can include a touch-screen interface, a scroll-and-click interface, a button interface, a microphone, etc.

In one embodiment, the UE 101 may comprise a wireless mobile terminal on GSM and/or UMTS network. As such, the UE 101 would include the subscriber identity module, which could be contained on a removable card (such as the SIM card 217). The SIM card 217 securely stores information used to identify a user or subscriber on UE 101 devices (such as mobile phones and computers). The SIM card 217 allows users to change devices by simply removing the SIM card 217 from one UE 101 and inserting it into another UE 101. A SIM card 217 contains a unique SIM card serial number (not shown), security authentication and ciphering information (not shown), temporary information related to the local network (not shown), a list of the services to which the user is entitled to access (not shown), and two passwords (PIN for usual use and PUK for unlocking) (not shown).

The SIM card 217 carries, for instance, important information, such as the cellular phone number, the carrier supplying service, subscription details, and security information. The SIM card 217 serves primarily to identify the UE 101 on the communication network 105. The SIM card 217 also contains a memory for storing a personal telephone number registry, text messages, and user specific mobile terminal settings. The SIM card 217 also contains an International Mobile Subscriber Identity or IMSI (not shown), which is a unique number associated with a GSM and/or UMTS network UE 101 user. The IMSI is used in any mobile network that interconnects with other networks, in particular CDMA and EVDO networks as well as GSM networks. An IMSI is usually 15 digits long, but can be shorter. The first 3 digits are the Mobile Country Code (MCC), followed by the Mobile Network Code (MNC) (either 2 digits for the European standard or 3 digits for the North American standard). The remaining digits are the Mobile Station Identification number (MSIN). The MCC identifies the home country of a user/subscriber, and the MNC identifies the home network of a user/subscriber. The MCC is often used in combination with the MNC (together sometimes called the Home Network Identity (HNI)) to uniquely identify a user's/subscriber's home network operator. The MSIN is a unique identifier that identifies the SIM card 217 or the user.

The non-volatile storage 213 can be used to store various types of information for use in operation of the UE 101. The information stored in the non-volatile storage 213 can include the hardware device identifiers 215. In one embodiment, a hardware device identifier 215 may comprise an International Mobile Equipment Identity (IMEI). The IMEI is a number that uniquely identifies a UE 101 (such as a GSM, WCDMA, iDEN or satellite mobile phone). The IMEI number is used by a GSM network to identify valid devices and therefore can be used for stopping a stolen phone from accessing the network. Unlike the electronic serial number or MEID of CDMA and other wireless networks, the IMEI is only used for identifying the device, and has no permanent or semi-permanent relation to the subscriber. Instead, the subscriber is identified by the IMSI number.

The processor module 211 controls the operation of the UE 101 and the interactions between the other components of the UE 101. For example, a user can enter a request through the user interface 209 for access to a service, and the processor module 211 would process the request and send the request to the services platform 103 via the communication interface 201. In response, the device identifier API 109 would send a response from the services platform 103 requesting identification of the device identifiers 215 and/or 219. The response would be received by the UE 101 through the communication interface 201, and the processor would then process the response. For example, the processor would obtain the hardware device identifiers 215 from the non-volatile storage 213 and/or the SIM card device identifiers 219 from the SIM Card 217, and the processor module would then send the hardware device identifiers 215 and/or the SIM card device identifiers 219 to the services platform 103 via the communication interface 201.

In other embodiments, as noted above, the UE 101 may comprise any of a number of other user devices. In such other embodiments, a device identifier based solution for tracking user activities on a service platform may use other unique, fixed device identifiers for such other UE 101 devices. For example, in the case of a mobile or fixed computing device, the device identifiers may comprise a hardware encoded serial number, an operating system serial number and other appropriate identifiers that, in combination, would identify the user to a sufficiently high degree of certainty.

Figure 3:
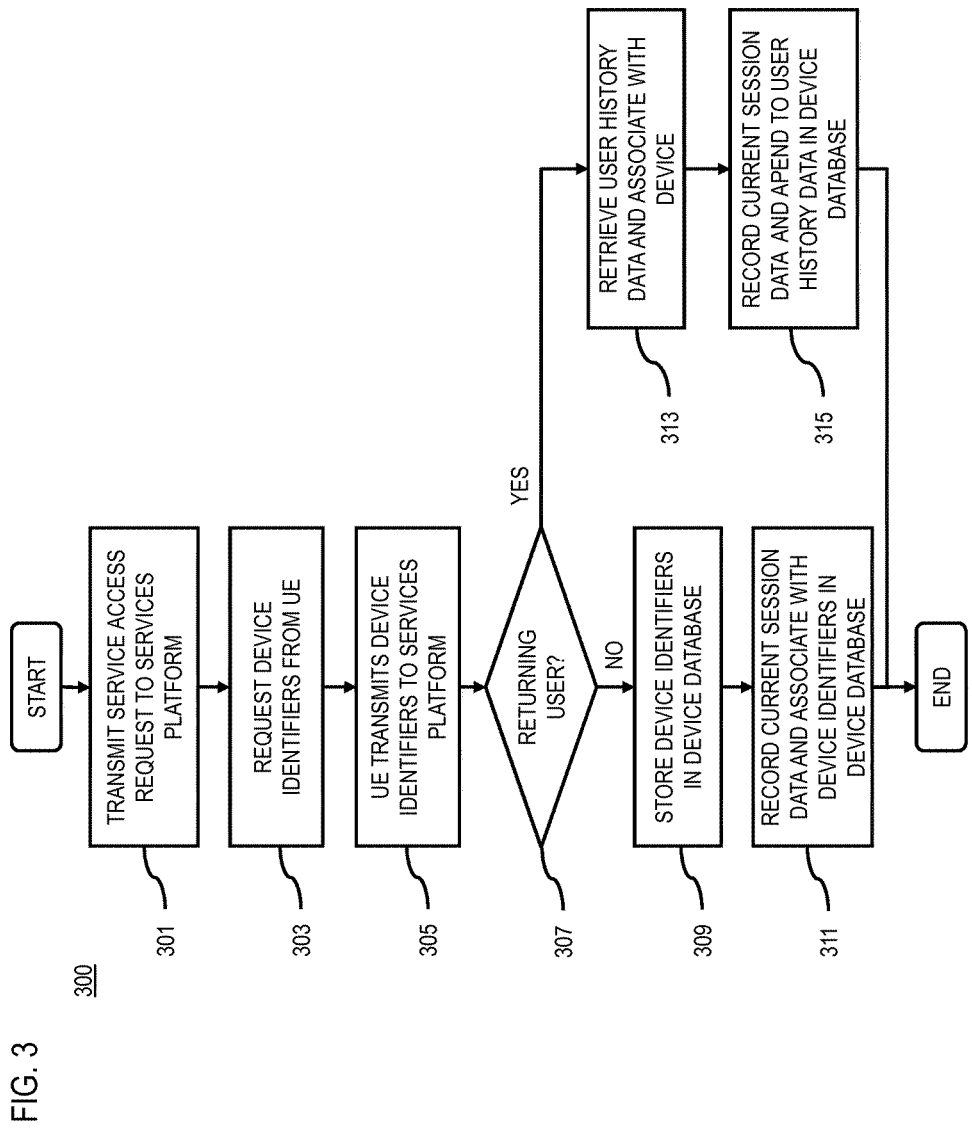
FIG. 3 is a flowchart of a process for a device identifier based solution for tracking user activities on a service platform, according to one embodiment.

FIG. 3 is a flowchart of a process 300 for a device identifier based solution for tracking user activities on a service platform, according to one embodiment. In one embodiment, the processor module 211 and/or the application 107 performs the process 300 and is implemented in, for instance, a chip set including a processor and a memory as shown FIG. 8. As such, the processor module 211 and/or application 107 can provide means for accomplishing various parts of the process 300 as well as means for accomplishing other processes in conjunction with other components of the UE 101 and/or services platform 103. For simplicity, an application 107 of the UE 101 is used to describe the process 300, but it is noted that other processes or modules of the UE 101 can perform the process 300.

At step 301, in response to a request to access one or more service applications on the services platform 103, the processor module 211 processes the request and transmits the request to the services platform 103 via the communication interface 201. The request may be initiated by the application 107 in response to a user request for access to services and/or content on the services platform 103. Alternatively, the request may be initiated by the application 107 in response to some other operation of the UE 101, such as an automated update service application or other automated or background application of the UE 101. In one example, the application 107 can request access to download music content from the services platform 103. In another example, the application 107 may request access to an information service for updated information.

Next, at step 303, the device identifier API 109 transmits a response to the UE 101 requesting identification of the device identifiers 115 for the UE 101. At step 305, the processor 211 receives and processes the response, and the UE 101 transmits the device identifiers 115 to the device identifier API 109 on the services platform 103. In one embodiment, the device identifiers 115 can include hardware device identifiers, independent of the user and the user's home country, operator and network, in addition to user-based identifiers contained in the SIM card 217. The device identifiers thereby may include the IMEI along with the MCC, MNC and the MSIN. Additionally, because a raw MSIN can be used by a hacker to clone a SIM card, to secure the MSIN and the subscriber identity, the MSIN may be hashed or encrypted.

Next, at step 307, the device identifier API 109 performs a heuristic analysis, as will be described in more detail below with reference to FIG. 6, to determine, based on the device identifiers 115, whether the UE 101 represents a returning user with respect to the requested service application or a new user. In one example, the device identifier first queries the services database 113 with respect to each of the device identifiers 115 to determine which device identifiers match device identifiers from devices/users that have previously accessed the requested service application. The heuristic then analyzes the results of the determinations, and draws a conclusion as to the status of the user as either a returning or new user to the requested service application. Accordingly, in accordance with this process for a device identifier based solution for tracking user activities on a service platform, a determination can be made as to whether a service application user is a new or returning user, without requiring the user to register a personalized account for the service.

When a determination is made at step 307 that the UE 101 represents a new user, at step 309, the device identifiers 115 are stored in the device/user records database 111. In one embodiment, the device identifier API 109 may create a temporary user account associated with the device identifiers 115. At step 311, the current session data is recorded and stored in the device/user records database 111 in association with the respective device identifiers 115 for the particular user and UE 101 or with the temporary user account associated with the device identifiers 115. In accordance with an embodiment of the present invention, therefore, a service application can track and store the activities of a new user's access to the service application, without requiring the user to register a personalized account for the service (e.g., during a trial period). Upon a subsequent access of the service by the new user, the service application is then able to retrieve and associate the historical data regarding the user in order to adapt or customize the service to provide the user with a more complete feature set and enhanced user experience.

Alternatively, when a determination is made at step 307 that the UE 101 represents a returning user to the service application, at step 313, the device identifier API 109 then retrieves any user history data from the device/user records database 111 associated with previous accesses of the service application by the user/UE 101, and associates such history data with the UE 101 currently accessing the service application. The user history data may be stored in the device/user records database 111 in a temporary user account associated with the device identifiers 115. At step 315, the current session data is recorded and appended to the user history data in the temporary user account stored in the device/user records database 111. In one embodiment, the services platform 103 may use the user history data to customize or adapt the service for the particular user. For example, for a digital music service, the services platform 103 may provide to the application 107 of the UE 101 a list of songs previously downloaded by the user, and/or previously stored user playlists and/or wish-lists. Additionally, for a music service, the services platform 103 may provide music recommendations based on the types of songs previously accessed or downloaded by the user. In accordance with an embodiment of the present invention, therefore, a service application can be adapted or customized to provide a user with a more complete feature set and enhanced user experience without requiring the user to register a personalized account for the service (e.g., during a trial period).

Figure 4:
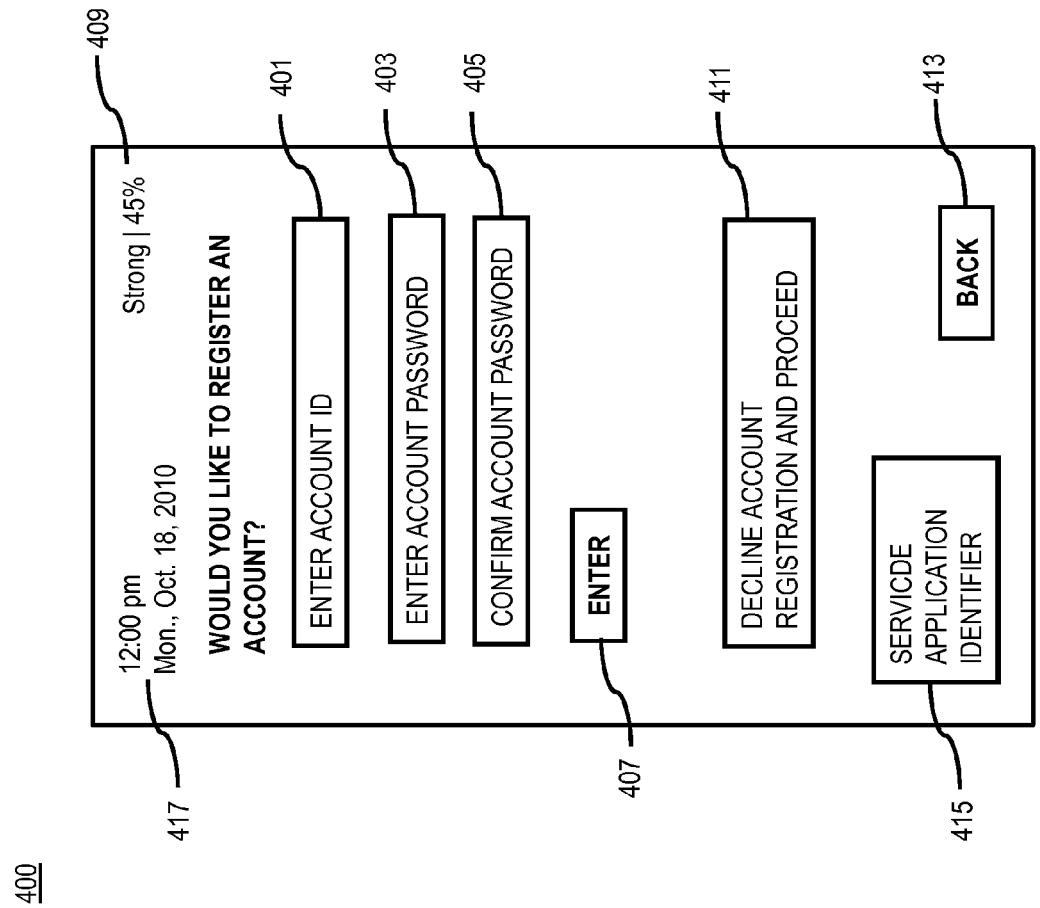
FIG. 4 is a diagram of a user interface screen, according to one embodiment.

With reference to FIG. 4, in one embodiment, the user may be provided a user interface screen 400 through the user interface 209 based on the results of the heuristic analysis. For example, in the event of a determination that the user is a new user, the device identifier API 109 may present the user with a user interface screen comprising a registration page 400. The registration page 400, for example, may query the user as to whether the user wishes to register for an account with the service application. The registration page 400 could display an interface 401 for creation of an account ID, and interfaces 403 and 405 for setting and confirming an account password. Once the user enters an account ID and password, the user could then choose an enter selection 407 to proceed. The registration page 400, in one embodiment, may also provide the user with a password strength indicator 409, specifying the strength of the account password on a scale, for example, of 0% to 100%. The password strength indicator could, for example, provide a password strength measure as the user enters a password, with the value changing as the user enters additional characters. Additionally, the registration page 400 may provide a service application identifier (e.g., application name and logo) 415, the time of day and date 417, and a "BACK" selection 413 to navigate to a previous page.

The registration page 400 may further present the user with the option 411 to decline to register an account for the service application. In the event that the user chooses to decline to register a user account for the service application, the device identifier API 109 would create the temporary user account associated with the device identifiers 115, and the current session data would be recorded and stored as described above with reference to Step 311. Alternatively, in the event of a determination that the user is a returning user, the device identifier API 109 may similarly present the user with a registration page 400. Then, in the event that the user declines the option to register an account for the service application, the current session data is recorded and appended to the user history data in the temporary user account stored in the device/user records database 111, as described above with reference to Step 315. In either case, in the event that the user chooses to register a user account for the service application, the process may proceed as described below with reference to FIG. 5.

Figure 5:
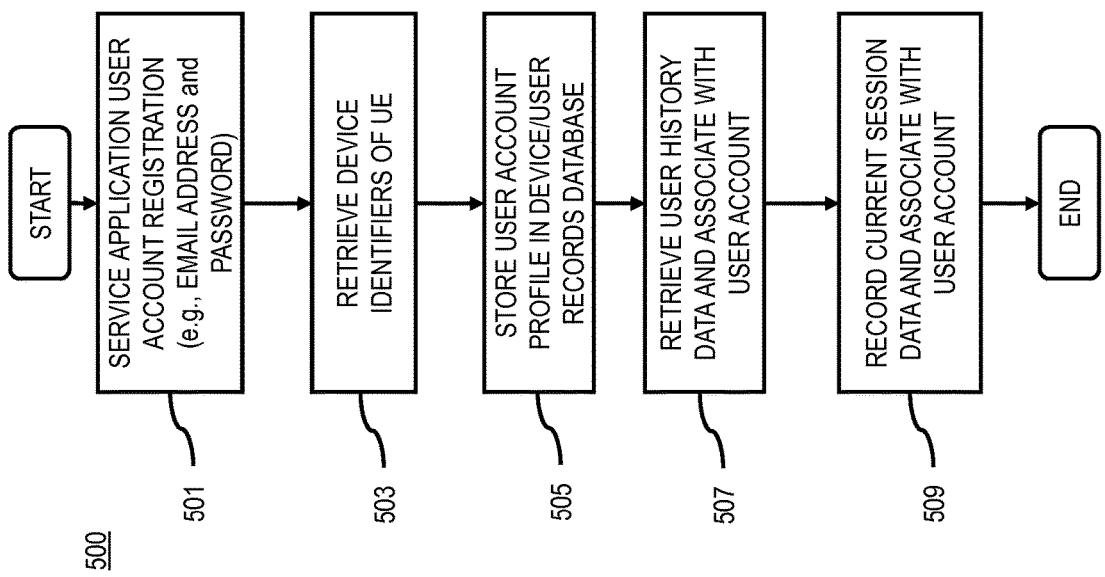
FIG. 5 is a flowchart of a process for a device identifier based solution for tracking user activities on a service platform, according to another embodiment.

FIG. 5 is a flowchart of a process 500 for a device identifier based solution for tracking user activities on a service platform, according to another embodiment. As with the process 300 of FIG. 3, in one embodiment, the process 500 may be performed by the processor module 211 and/or the application 107, which may be implemented in, for instance, a chip set including a processor and a memory as shown FIG. 8. As such, the processor module 211 and/or application 107 can provide means for accomplishing various parts of the process 300 as well as means for accomplishing other processes in conjunction with other components of the UE 101 and/or services platform 103. For simplicity, an application 107 of the UE 101 is used to describe the process 500, but it is noted that other processes or modules of the UE 101 can perform the process 500.

In this embodiment, at the point where a user creates a registered user account for one or more service applications, the device identifiers 115 are stored with the user account profile, and the user history data associated with those device identifiers 115 is retrieved and linked with the user account. At step 501, a user registers a personal user account for a service application on the services platform 103. The user account profile may be established based on a variety of authentication methods, such as email address and password, user chosen user ID and password, etc. Next, at step 503, the device identifier API 109 retrieves the device identifiers 115 from the UE 101. At step 505, the device identifier API 109 then stores the retrieved device identifiers 115 in the device/user records database 111 as part of the user account profile for the particular user and UE 101.

Next, at step 507, the services platform 103 retrieves any user history data stored in a temporary user account in the device/user records database associated with the particular device identifiers 115 of the UE 101/user. In one embodiment, the user will be using, for instance, the same UE 101 with the same SIM card 217 as was used during prior accesses of the service application, and thus the device identifiers 115 will match the device identifiers associated with the temporary user account. In that case, the services platform 103 will retrieve the user history data from the temporary account associated with the matching device identifiers 115. At step 509, the current session data is recorded and appended to the user history data in the device/user records database 111. As noted above, the services platform 103 may use the user history data to customize or adapt the service for the particular user. In accordance with an embodiment of the present invention, therefore, once a service application user registers an account for the service, the user's history from prior to establishment of the account can be retrieved and linked to the user account. The service application can thereby be adapted or customized such that any prior activities of the user are maintained to provide the user an efficient transition with a more complete feature set and enhanced user experience upon account initiation.

In an alternative embodiment, the device identifiers 115 retrieved and stored with the user account profile at step 503 may not all match the device identifiers 115 associated with a temporary account stored in the device/user records database 111. Nonetheless, the user associated with the new registered account created at step 501 may be the same user as one who has accessed the service application at a prior time. For example, the user may have accessed the service application using one UE 101, and subsequently accesses the same service application using a different UE 101 with the same SIM card 217. For instance, in the case where a user's UE 101 malfunctions or the user decides to upgrade a UE 101, the user may deploy a new or different UE 101 (e.g., where the user owns multiple UE 101's) and use the same SIM card in the new UE 101. In this embodiment, the device identifier API 109 can perform a heuristic analysis to determine, based on the device identifiers 115, whether the UE 101/user represents a returning user with respect to the requested service application. As noted above, the device identifier queries the services database 113 with respect to each of the device identifiers 115 to determine the device identifiers 115 that match device identifiers 115 from previous users, and the heuristic analysis is performed, analyzing the results of the determinations, and drawing a conclusion as to the status of the user as either a returning or new user to the requested service application. In the example where the same user registers the user account using a new UE 101 with the same SIM card 217 as used during prior accesses, the services platform 103 and the device identifier API 109 can identify the user as a returning user, and retrieve the user history stored in the device/user records database 111 from the prior accesses by the user, and associate the user history data with the newly registered user account.

In a further embodiment, a device identifier based solution for tracking user activities on a service platform may be employed in a digital rights management (DRM) service application. By way of example, the device identifier based solution for tracking user activities on a service platform may be used to track and associate digital media rights (e.g., digital music or digital video rights licenses) based on the device identifiers 115 of a user/UE 101. In this example, the session data recorded and stored with respect to a user's access of a DRM enabled service application (through a particular UE 101 or with a particular SIM card 217) may include digital media rights obtained by the user during the session. Accordingly, the digital media rights would be stored in the device/user records database 111 in association with the device identifiers 115 of the user/UE 101 or in association with the temporary account of the user/UE 101. Upon subsequent access of the DRM enable service application by the user (either using the same UE 101 or a different UE 101 with the same SIM card 217, for example), the DRM enabled service application could then recognize the prior digital media rights of the user and grant the user access to the associated digital media. The device identifier based solution for tracking user activities on a service platform would thereby enable a user to retain digital media rights from prior sessions on a DRM enabled service application, without requiring the user to register a personalized account for the service (e.g., during a trial period).

FIG. 6 illustrates a table 600 providing an example of a heuristic analysis employed in a process for a device identifier based solution for tracking user activities on a service platform, according to one embodiment. As noted above, the heuristic analysis is employed to determine, based on the device identifiers 115, whether the UE 101 represents a returning user with respect to a requested service application or a new user. Based on the combination of device identifiers 115 that match records in the device/user records database 111, it can be determined with certain probability whether the user is a returning user or a new user. In one example, as illustrated by the line 601 of FIG. 6, the device identifier API 109 determines that neither the IMEI, the MCC+MNC or the hashed MSIN of the UE 101 currently accessing a service application on the services platform 103 matches any records in the device/user records database 113 for UE 101's that have previously accessed the service application. In this example, because none of the device identifiers 115 match the records of any previous UE 101 that has accessed the service application, the device identifier API concludes that the current UE 101 is a new user. In an alternative example, as illustrated by the line 603 of FIG. 6, the device identifier API 109 determines that the IMEI, the MCC+MNC and the hashed MSIN of the UE 101 currently accessing the service application all match a record in the device/user records database 113 for a UE 101 that has previously accessed the service application. Accordingly, because all of the device identifiers 115 match the record of a previous UE 101 that has accessed the service application, the device identifier API concludes that the current UE 101 is the same device as the previous UE 101.

The level of certainty of the conclusion drawn based on the heuristic depends on various factors. One such factor may be the number and strength of the device identifiers 115 used for identifying the UE 101, with the strength being related to how readily the identifiers may be transferred from one user to another or from one device to another. In one embodiment, for example, when considered independently, the hashed MSIN may be considered as the strongest device identifier 115, with the IMEI being weaker and the MCC+MNC being the weakest. Under this example, as illustrated by line 605 of FIG. 6, when neither the IMEI nor the MCC+MNC match any UE 101 records of the device/user records database 113, but the hashed MSIN matches a record of a previous UE 101 that accessed the service application, the device identifier API may conclude that the current UE 101 is the same user as the previous UE 101. Here, because the hashed MSIN represents a reasonably secure identification of the specific user, a conclusion can be made to a relatively high degree of certainty.

Alternatively, when considered in combination, the IMEI and the MCC+MNC may be considered of sufficient strength. For example, as illustrated by line 607 of FIG. 6, when the IMEI and the MCC+MNC match a UE 101 record of the device/user records database 113 relating to a previous UE 101 that accessed the service application, but the hashed MSIN does not match the record for the previous UE 101, the device identifier API may conclude that the current UE 101 is the same user as the previous UE 101. Here, while neither the IMEI nor the MCC+MNC by itself represents a strong identifier, the two in combination may be viewed as a fairly strong identification of the user. The IMEI represents a reasonably strong identifier for the UE 101, and when viewed in combination with the MCC+MNC, the likelihood of identifying a returning user is increased. It should be noted, however, that the heuristic identification illustrated by line 607 may be viewed as a weaker case than the heuristic identification illustrated by line 605, and as such, in one embodiment, the heuristic analysis could be designed to conclude that the circumstances illustrated by line 607 represents a new user.

Additionally, when a particular user has accessed a service application using one UE 101, and subsequently accesses the same service application using a different UE 101 with the same SIM card 217, the services platform 103 and the device identifier API 109 can identify the user as a returning user. For instance, in the case where a user's UE 101 malfunctions or the user decides to upgrade a UE 101, or the user simply makes use of more than one UE 101, the user may deploy a new or different UE 101 and use the same SIM card in the new UE 101. In such a case, as illustrated by line 609 of FIG. 6, the IMEI of the new UE 101 will not match the records for the user in the device/user records database 111, but the MCC+MNC and the hashed MSIN from the user's SIM card 217 will match the records for the user. The device identifier API 109 may then determine that the user is a returning user and associate the user's historical data records in the device/user records database 111 with the new UE 101. The service provider is thereby able to provide the same enhanced the user experience when the user employs a new or multiple UE's 101 using the same SIM card 217.

Moreover, a situation could arise where a user may sell or otherwise transfer a UE 101 to another user (without the original user's SIM card 217). The subsequent user may then use the new UE 101 with a new SIM card 217. Under this scenario, if the subsequent user accesses a service application that the previous user has accessed, as illustrated in line 611 of FIG. 6, the device identifier API 109 would determine that the IMEI of the UE 101 matches that of a record in the device/user records database 111 from the previous user, but neither the MCC+MNC nor the hashed MSIN matches the database record from that user. The device identifier API 109 would then determine that the UE 101 and user represent a new user. Alternatively, the subsequent user may use the new UE 101 with a SIM card 217 that the subsequent user has previously used with a different UE 101 (through which the subsequent user had previously accessed the service application). Under this scenario, as illustrated in line 609 of FIG. 6, the device identifier API 109 would determine that the MCC+MNC and the hashed MSIN matches a record in the device/user records database 111 from the subsequent user (from the subsequent user's SIM card 217), but the IMEI does not match the IMEI from the database record. The IMEI, however, would match a database record from the previous user of the UE 101. Here, the device identifier API 109 would determine that the UE 101 and user represent a returning user, associated with the database record with the matching MCC+MNC and hashed MSIN.

In other embodiments, the combinations of device identifiers specified in the heuristic analysis table illustrated in FIG. 6 may be designed to arrive at different results than those specified in FIG. 6. The results may be designed based on a tradeoff between various factors associated with the process. By way of example, the process design may account for a tradeoff between the level of security desired to protect the historical data being tracked from being accessible to the wrong UE 101 or user, as viewed against the importance of accurately determining when a UE 101 represents a returning user. For example, when the historical data respecting a user's prior access to a service application is not highly sensitive from a security standpoint, the process may be designed to enhance the likelihood of identifying a returning user, such as in the case of line 607 of FIG. 6. Alternatively, when dealing with historical data of a more sensitive nature from a security standpoint, the process may be designed to conclude that the circumstances illustrated by line 607 represents a new user, which may increase the possibility of improperly identifying a returning user under the circumstances of line 607 as a new user. As such, the ability to more consistently identify a UE 101 as a returning user may be diminished as a tradeoff for enhanced security of the historical data respecting the UE 101 or user. Moreover, in other embodiments, fewer, additional, or different device identifiers may be utilized.

The processes described herein for a device identifier based solution for tracking user activities on a service platform may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
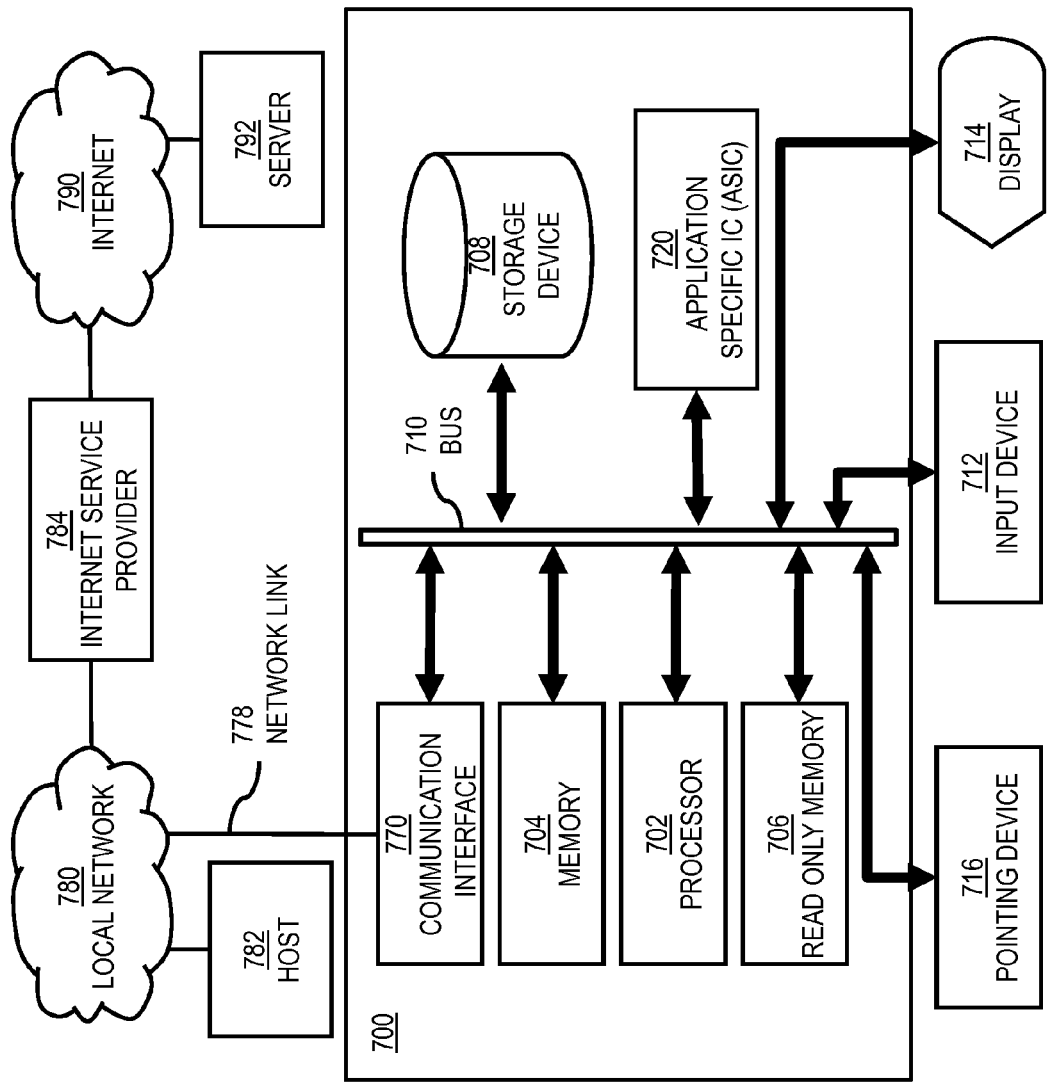
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide device identifier based solution for tracking user activities on a service platform as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of the process for a device identifier based solution for tracking user activities on a service platform.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing a device identifier based solution for tracking user activities on a service platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for the process of a device identifier based solution for tracking user activities on a service platform. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for the process of a device identifier based solution for tracking user activities on a service platform, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for interfacing with the UE 101 to provide a device identifier based solution for tracking user activities on a service platform.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
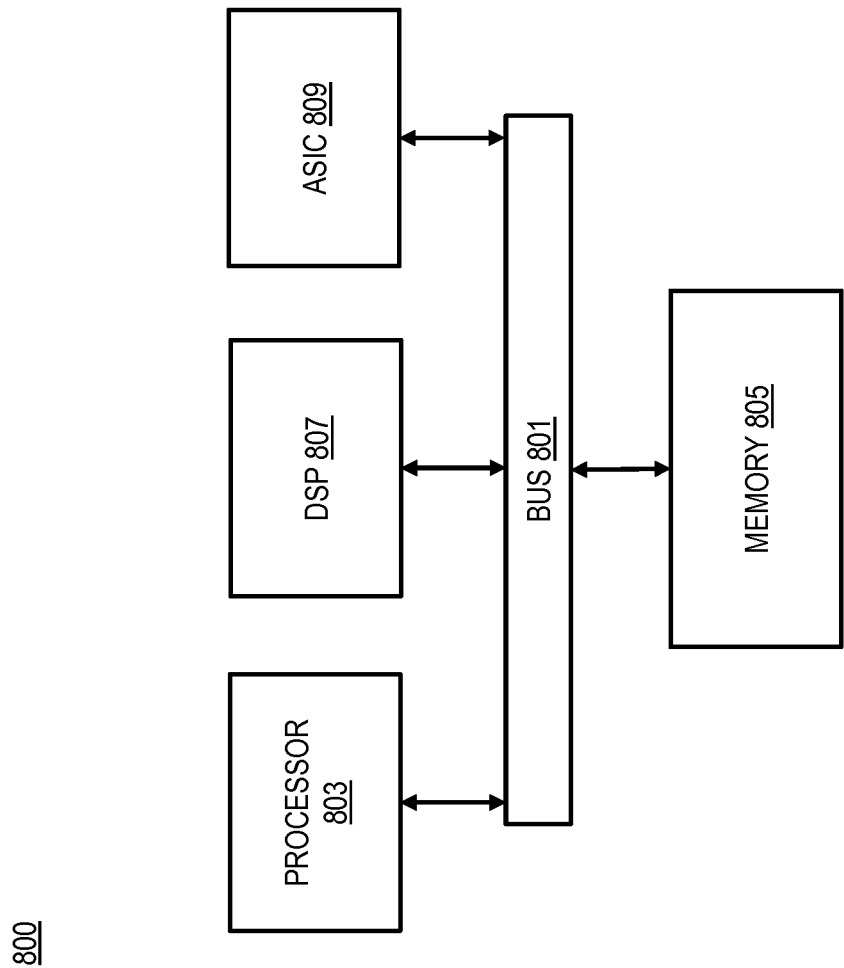
FIG. 8 is a diagram of a chip set that can be used to implement an embodiment of the invention.

FIG. 8 illustrates a chip set or chip 800 upon which an embodiment of the invention may be implemented. Chip set 800 is programmed to provide a device identifier based solution for tracking user activities on a service platform as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of a process for a device identifier based solution for tracking user activities on a service platform.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a device identifier based solution for tracking user activities on a service platform The memory 805 also stores the data associated with or generated by the execution of the inventive steps.

Figure 9:
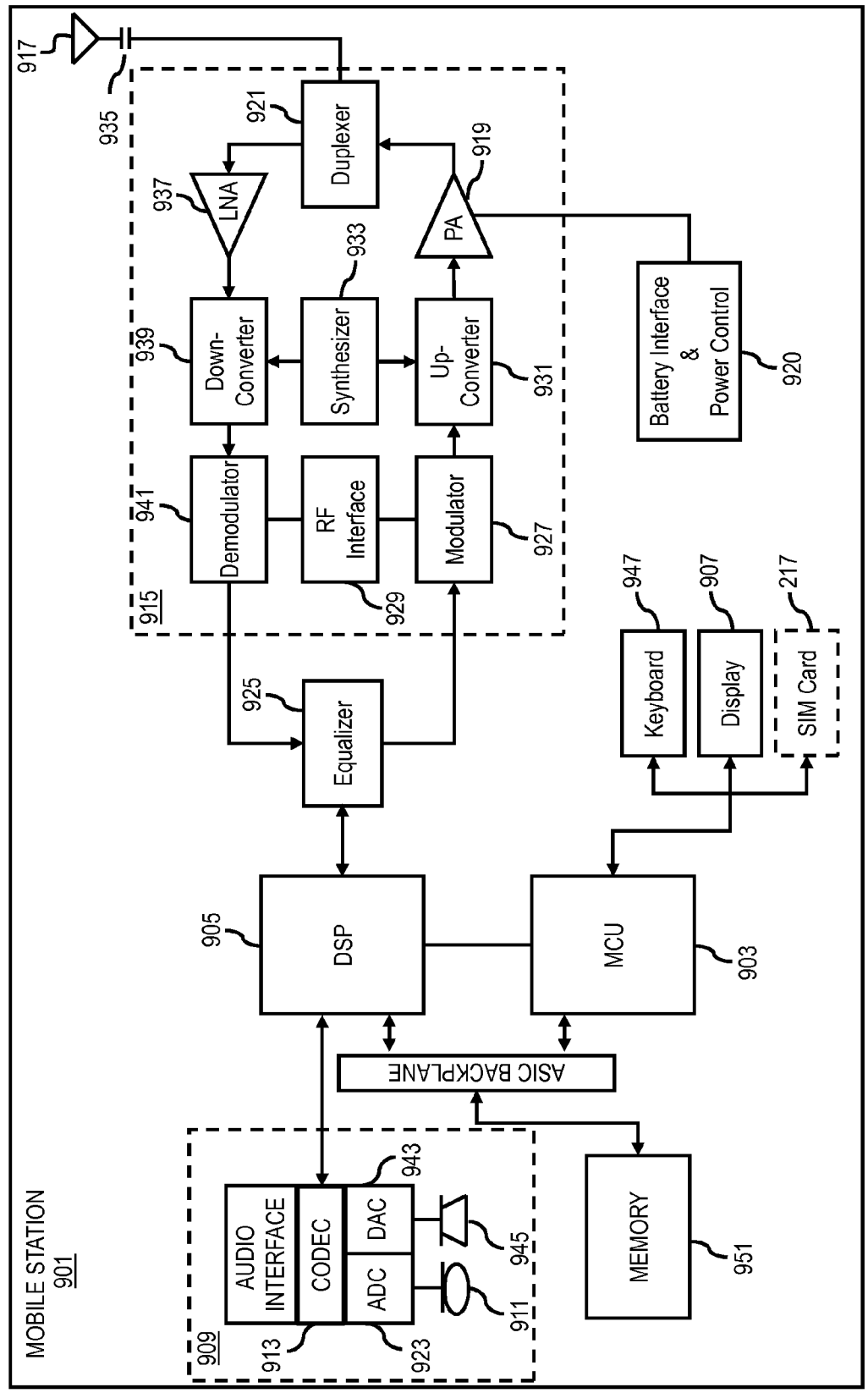
FIG. 9 is a diagram of a mobile terminal (e.g., handset) that can be used in an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of a device identifier based solution for tracking user activities on a service platform. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of a device identifier based solution for tracking user activities on a service platform. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The MCU 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of the MCU 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to perform or support the steps of a device identifier based solution for tracking user activities on a service platform. The MCU 903 also delivers a display command and a switch command to the display 907 and to the speech output switching controller, respectively. Further, the MCU 903 exchanges information with the DSP 905 and can access a SIM card 217 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving from a user device a user request to access a service platform of a service provider from an unregistered user, and the service platform comprising at least one processor, wherein the access comprises access by the unregistered user to a service on the service platform;
determining, by the service platform, one or more identifiers associated with the user device, wherein the one or more identifiers are device identifiers and comprise one or more of an International Mobile Equipment Identity (IMEI), a Mobile Country Code (MCC), a Mobile Network Code (MNC), and a Mobile Station Identifier Number (MSIN);
generating a record of the access with respect to the one or more identifiers;
determining based on the one or more identifiers whether the user device has previously accessed the service;
associating the record from one or more previous accesses to the service with the user device while the user remains unregistered with a user account after the unregistered user creates a registered user account; and
causing, at least in part, a heuristic analysis of the one or more identifiers to determine whether the user device has previously accessed the service when at least two of the identifiers are matched in the record of the one or more previous accesses to the service,
wherein the heuristic analysis is based, at least in part, on assigning different identification strengths to the one or more identifiers based on characteristics of the one or more identifiers, the strengths reflecting how readily the one or more identifiers transferred from one device to another or from one user to another.

2. The method of claim 1, wherein the record comprises information regarding one or more actions, one or more activities and one or more behaviors associated with the access by the user for performing digital rights management.

3. The method of claim 1, further comprising:
adapting the access to the service platform for the user based, at least in part, on the record from the one or more previous accesses to the service by the user device.

4. The method of claim 1, further comprising:
determining whether a registered user account is associated with the request; and
associating the record with the registered user account.

5. The method of claim 1, further comprising:
determining to create a registered user account associated with the request, and associating the one or more identifiers with the registered user account; and determining to associate the record with the registered user account.

6. An apparatus comprising:
at least one processor; and
at least one memory including computer program code for one or more programs,
the at least one memory and the computer program code configured to, with the at least one processor, cause the apparatus to perform at least the following,
determine, by a service platform of a service provider, one or more identifiers associated with a user device in response to a request from the user device to access the service platform sent from an unregistered user, wherein the one or more identifiers comprise one or more of an International Mobile Equipment Identity (IMEI), a Mobile Country Code (MCC), a Mobile Network Code (MNC) and a Mobile Station Identifier Number (MSIN), wherein the access comprises access by the user to a service on the service platform;
generate a record of the access with respect to the one or more identifiers;
determine based on the one or more identifiers whether the user device has previously accessed the service when at least two of the identifiers are matched in the record of the one or more previous accesses to the service;
associate the record from one or more previous accesses to the service with the user device while the user remains unregistered with a user account after the unregistered user creates a registered user account; and
cause, at least in part, a heuristic analysis of the one or more identifiers to determine whether the user device has previously accessed the service when at least two of the identifiers are matched in the record of the one or more previous accesses to the service,
wherein the heuristic analysis is based, at least in part, on assigning different identification strengths to the one or more identifiers based on characteristics of the one or more identifiers, the strengths reflecting how readily the one or more identifiers transferred from one device to another or from one user to another.

7. The apparatus of claim 6, wherein the record comprises information regarding one or more actions, one or more activities and one or more behaviors associated with the access by the user for performing digital rights management.

8. The apparatus of claim 6, wherein the apparatus is further caused to:
determine to adapt the access to the service platform for the user based, at least in part, on the record from the one or more previous accesses to the service by the user device.

9. The apparatus of claim 6, wherein the apparatus is further caused to:
determine to create a registered user account associated with the request, and associate the one or more identifiers with the registered user account; and
determine to associate the record with the registered user account.

10. A non-transitory computer-readable storage medium carrying one or more sequences of one or more instructions which, when executed by one or more processors, cause an apparatus to at least perform the following steps:
receiving from a user device a user request to access a service platform of a service provider from an unregistered user, and the service platform comprising at least one processor, wherein the access comprises access by the unregistered user to a service on the service platform;
determining, by the service platform, one or more identifiers associated with the user device, where in the one or more identifiers are device identifiers and comprise one or more of an International Mobile Equipment Identity (IMEI), a Mobile Country Code (MCC), a Mobile Network Code (MNC), and a Mobile Station Identifier Number (MSIN); and
generating a record of the access with respect to the one or more identifiers;
determining based on the one or more identifiers whether the user device has previously accessed the service;
associating the record from one or more previous accesses to the service with the user device while the user remains unregistered with a user account after the unregistered user creates a registered user account; and
causing, at least in part, a heuristic analysis of the one or more identifiers to determine whether the user device has previously accessed the service when at least two of the identifiers are matched in the record of the one or more previous accesses to the service,
wherein the heuristic analysis is based, at least in part, on assigning different identification strengths to the one or more identifiers based on characteristics of the one or more identifiers, the strengths reflecting how readily the one or more identifiers transferred from one device to another or from one user to another.

11. The computer-readable storage medium of claim 10, wherein the apparatus is caused to further perform:
determining whether a registered user account is associated with the request; and
associating the record with the registered user account.

12. The computer-readable storage medium of claim 10, wherein the apparatus is caused to further perform:
determining to create a registered user account associated with the request, and associate the identifiers with the registered user account; and
determining to associate the record with the registered user account.

13. The method of claim 1, wherein the one or more identifiers comprise one or more subscriber identity module card numbers, and the method further comprising:
determining based, at least in part, on the one or more subscriber identity module card numbers whether the user has previously accessed the service; and
associating the record from one or more previous accesses to the service with the user.

14. The method of claim 1, wherein the heuristic analysis is based, at least in part, on a number of the one or more identifiers.

15. The method of claim 1, wherein the heuristic analysis is based, at least in part, on a number of the one or more identifiers, the method comprising:
assigning the one or more identification strengths to reflect a greater identification strength for the user device having a plurality of identifiers than would be assigned for a user device having fewer identifiers.

* * * * *